US009883224B2

(12) United States Patent
Donnellan et al.

(10) Patent No.: US 9,883,224 B2
(45) Date of Patent: Jan. 30, 2018

(54) TAKE IT WITH YOU PREMIUM VIDEO CONTENT

(71) Applicant: Cellco Partnership, Basking Ridge, NJ (US)

(72) Inventors: Kevin Donnellan, North Brunswick, NJ (US); Quentin N. Robinson, Willingboro, NJ (US); Te-Sheng Lin, Cresskill, NJ (US); Muxiang Zhang, Winchester, MA (US); Young Rak Choi, Belle Mead, NJ (US); Samuel Olushermimo Akiwumi-Assani, Beacon, NY (US)

(73) Assignee: Cellco Partnership, Basking Ridge, NJ (US)

( * ) Notice: Subject to any disclaimer, the term of this patent is extended or adjusted under 35 U.S.C. 154(b) by 218 days.

(21) Appl. No.: 14/101,689

(22) Filed: Dec. 10, 2013

(65) Prior Publication Data
US 2015/0163533 A1    Jun. 11, 2015

(51) Int. Cl.
*H04N 21/258* (2011.01)
*H04N 21/4363* (2011.01)
*H04N 21/441* (2011.01)
*H04N 21/442* (2011.01)
*H04N 21/45* (2011.01)
*H04N 21/647* (2011.01)
*H04N 21/41* (2011.01)
*H04N 21/4627* (2011.01)
*H04N 21/418* (2011.01)
*H04N 21/438* (2011.01)

(52) U.S. Cl.
CPC ..... *H04N 21/4126* (2013.01); *H04N 21/4182* (2013.01); *H04N 21/438* (2013.01); *H04N 21/43637* (2013.01); *H04N 21/441* (2013.01); *H04N 21/4627* (2013.01)

(58) Field of Classification Search
None
See application file for complete search history.

(56) References Cited

U.S. PATENT DOCUMENTS

2005/0198673 A1* 9/2005 Kit et al. ............. 725/68
2007/0061886 A1* 3/2007 Le ..................... G06F 21/10
726/26

(Continued)

OTHER PUBLICATIONS

Jane L. Levere, "In-Room Entertainment Turns Away From TV"; Hotel Guests Turn Away From TV and Toward Streaming Media—NYTimes.com; The New York Times, Business Day; Apr. 30, 2013; pp. 1-4; http://www.nytimes.com/2013/05/01/business/hotel-guests-turn-away-from-tv-and-toward-streaming-media.html?pagewanted=all&_r=0.

(Continued)

*Primary Examiner* — Brian T Pendleton
*Assistant Examiner* — Jean D Saint Cyr

(57) ABSTRACT

To allow a user to temporarily move access to premium content to another location, e.g. outside the vicinity of the home, while adequately protecting the rights of a broadcast content provider, the various examples implement a transfer of an object for an identified right of content usage between premium content reproduction devices and a mobile device. The mobile device enables such transfer to support viewing of the premium content by a user outside of the user's home.

20 Claims, 7 Drawing Sheets

(56) References Cited

U.S. PATENT DOCUMENTS

| | | | |
|---|---|---|---|
| 2008/0310620 A1* | 12/2008 | Kim ........................ | G06F 21/10 380/28 |
| 2009/0064344 A1* | 3/2009 | Kim et al. ..................... | 726/27 |
| 2012/0129489 A1* | 5/2012 | Cassidy et al. ............... | 455/406 |
| 2012/0172027 A1* | 7/2012 | Partheesh ............. | H04W 4/021 455/420 |
| 2012/0210364 A1* | 8/2012 | Lee .................... | H04N 21/2668 725/51 |
| 2013/0030912 A1* | 1/2013 | Chu et al. .................. | 705/14.49 |
| 2013/0090106 A1* | 4/2013 | Mathews ................ | H04W 4/06 455/418 |
| 2013/0115972 A1* | 5/2013 | Ziskind .................. | H04W 4/02 455/456.2 |
| 2014/0150036 A1* | 5/2014 | Jeon .................... | H04B 5/0025 725/74 |

OTHER PUBLICATIONS

Brad Stone, "Here Comes Amazon's Kindle TV Set-Top Box"; Businessweek; Apr. 24, 2013; pp. 10-11; http://www.businessweek.com/articles/2013-04-24/here-comes-amazons-kindle-tv-set-top-box.

\* cited by examiner

TAKE IT WITH YOU PREMIUM VIDEO CONTENT

BACKGROUND

In recent years, the in-home broadcast TV market has been dominated by broadcast content providers, such as cable, satellite and fiber (e.g., Cox, Comcast, Verizon FiOS, Dish, or DirecTV), who offer premium content subscriptions. The premium content subscriptions often come in packages with many channels that offer content that costs more to view than basic packages. These broadcast providers typically control their own broadband networks over which the content is delivered. Broadcast providers may also provide IP based content delivery in addition to the traditional broadcast content delivery.

There is a shift in the industry to over the top (OTT) content providers such as Netflix, Redbox Instant and Amazon instant video, which use the Internet to deliver content. OTT content providers are another example of IP based content delivery. These OTT content providers are independent of broadband Internet service providers or the broadcast content providers and allow the OTT content provider's content to be viewed anywhere a user has an Internet connection and access to the OTT content provider. Because these OTT content providers do not control the broadband networks or the Internet over which their content is delivered, the content delivery is typically based on a "best effort" network performance and content reproduction quality may be impacted.

These various different content providers offer different ranges/levels/packages of content, depending on their contractual arrangements with the actual sources, suppliers or creators of the content. For example, IP based content delivery services do not always provide the same level of premium content as the traditional broadcast content providers because the security of the IP based content is not as strong as the security of the traditional broadcast content providers' content; and therefore the suppliers of the actual premium content may prefer the IP providers not deliver their most valuable content (e.g. current and desirable content). The IP based content delivery services often have an extensive library of on-demand and multicast content, but may not offer the most valuable premium content.

Increasingly, broadcast content providers also offer an option to view recorded, on-demand or streaming premium content within the vicinity of the home, for example, on a computer, tablet or smartphone via an in-home Wi-Fi link. The broadcast content providers control the access location by requiring that the content is delivered via a broadband wireless router connected to a broadband modem that can be validated as located in the house. While the terms home or house most commonly refer to a user's residence, they may also refer to an office; a school; a store; a vehicle such as a car, a truck, a tractor trailer or a recreational vehicle (RV); or any other location that represents the user's primary viewing area.

One reason broadcast content providers do not provide premium content outside the home is to protect the rights of the broadcast content providers, as well as the rights of content producers (e.g., HBO, Showtime, etc.), by not providing the premium content to be viewed by multiple people at multiple locations, including unknown locations, simultaneously. That is, broadcast content providers are unable to reliably authenticate and validate who is authorized to view the premium content. End users, however, increasingly want to view content they pay for wherever and whenever they desire.

One technique of extending the viewing of premium content from a subscriber's home to other locations is via a product called "Slingbox." The Slingbox solution allows the premium content to be decoded at the original location (subscriber home) using the subscriber's access right or credentials for the subscription associated with the home, and then the premium content is sent via IP to the other location to be viewed. In this case the content can be viewed at the original location even though it is also "slung" to the other location.

The other current approach for extending the viewing of premium content to other locations is via a TV Everywhere strategy offered by broadcast content providers and even some content producers. This TV Everywhere strategy makes premium content available online, but behind a login wall where the broadcast content provider or content producer can reliably authenticate and validate the user as authorized to view the premium content to paying subscribers. In some situations, this premium content is delivered directly as an app on a smartphone or available via a web browser from a user terminal, such as a computer or tablet.

Alternate technologies that allow a user to temporarily move access to premium content from the vicinity of a home to another location outside the vicinity of the home while adequately protecting the rights of the broadcast content provider would be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to the transfer of an object for an identified right of content usage between premium content reproduction devices and a mobile device to enable such a transfer, to support viewing of the premium content by a user outside of the user's home.

Figure 1:
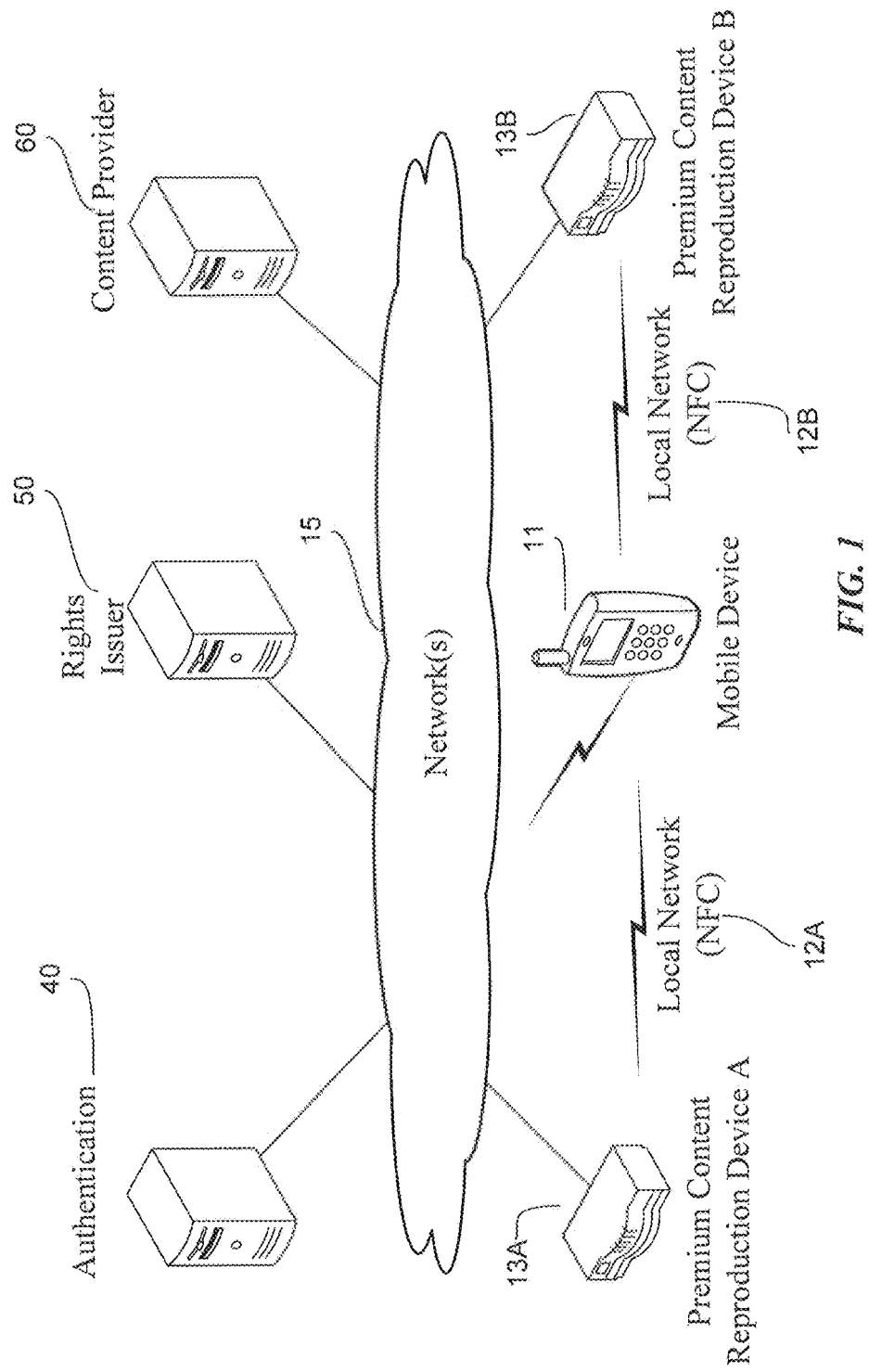
FIG. 1 is a high-level functional block diagram of an example of a system that provides for transfer of a premium content right from a premium content reproduction device A to a mobile device and from the mobile device to a premium content reproduction device B.

Reference now is made in detail to the examples illustrated in the accompanying drawings and discussed below. FIG. 1 illustrates a system that provides for transfer of a premium content right from a premium content reproduction device 13A to a mobile device 11 and from the mobile device 11 to another premium content reproduction device 13B.

In various examples, premium content reproduction device 13A and premium content reproduction device 13B are in communication with an authentication server 40, a Rights Issuer (RI) 50, and a content provider 60 via network(s) 15. Network(s) 15 may be a broadband network (e.g., cable, fiber, or satellite), the Internet, or some combination of both. For example, any one of authentication server 40, RI 50 or content provider 60, all three, or any combination of the three may be connected with a common broadband network to which premium content reproduction device 13A and/or premium content reproduction device 13B is also connected via a broadband network connection. In this example, communications between elements with connections to the common broadband network would not necessarily pass via the Internet. However, in this example, communications between elements without a connection to a common broadband network, would pass via the Internet and/or via other connections directly between multiple broadband networks. Premium content reproduction devices 13A, 13B may utilize, for example, a wired or wireless network connection to establish a connection with network(s) 15.

Further in various examples, a mobile device 11 is also in communications with the authentication server 40, the RI 50, and the content provider 60 via network(s) 15. Mobile device 11 connects with network(s) 15, for example, via a cellular data network or a wireless data network such as Wi-Fi. In addition, mobile device 11 is also in communications with premium content reproduction devices 13A, 13B via local networks 12A, 12B. Local networks 12A, 12B use, for example, wired network communications or wireless network communications such as NFC.

Figure 7:
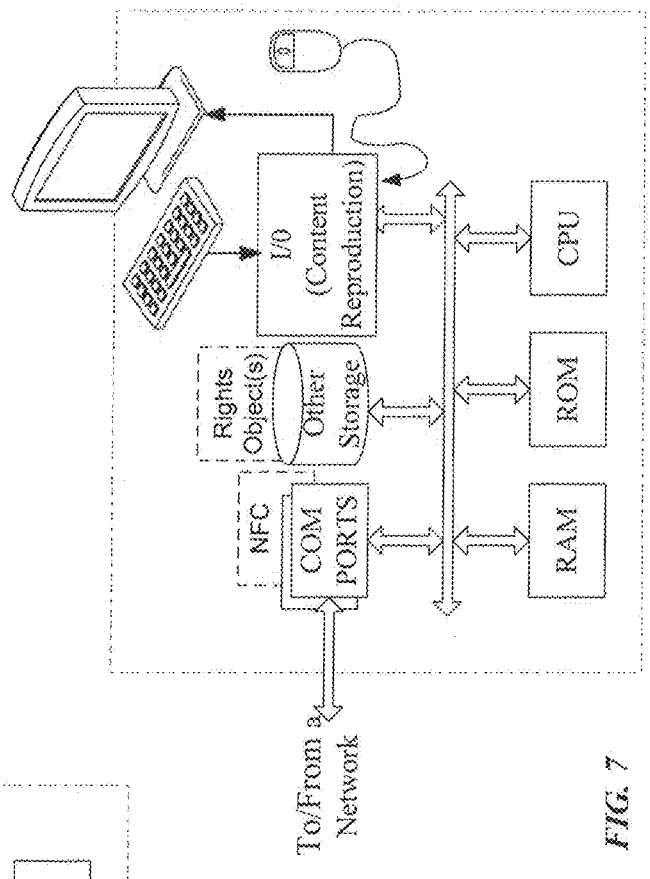
FIG. 7 is a simplified functional block diagram of a personal computer or other work station or terminal device that may be configured, for example, to function as a premium content reproduction device in the system of FIG. 1.
Figure 8:
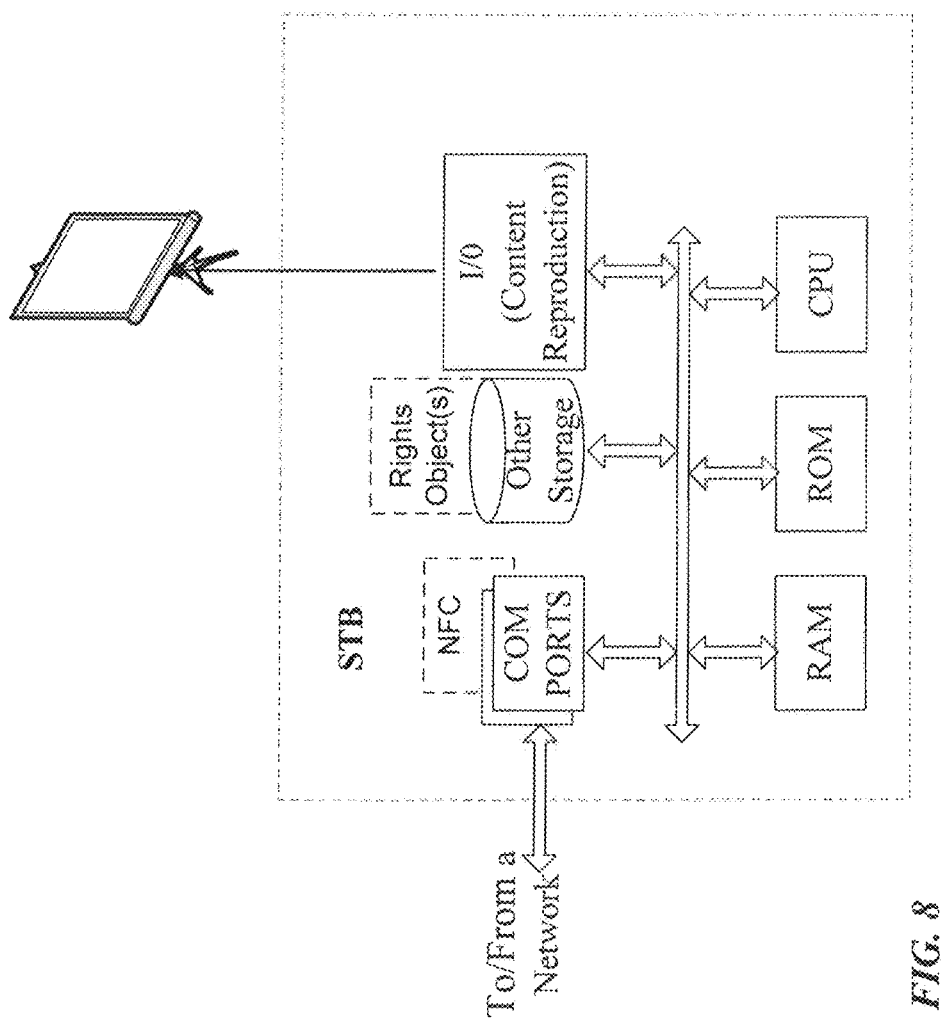
FIG. 8 is a simplified functional block diagram of a set top box (STB) that may be configured, for example, to function as a premium content reproduction device in the system of FIG. 1.

In a common example, premium content reproduction device 13A, 13B is a set top box (STB) in a viewer's home, such as depicted in FIG. 8 The viewer's STB contains the appropriate object(s) for an identified right of content usage to allow the viewer to view premium content in the viewer's home. As described above, in the background, the viewer's STB and contained object(s) for an identified right of content usage allow the user to view the premium content not only on a television connected to the STB, but also on other devices, such as a computer or tablet as depicted in FIG. 7, that are also located in the home. Assume, for example, that the other device is a tablet computer (not shown). The viewer views the premium content on the tablet computer by connecting the tablet computer to the STB, which authorizes the viewing based on the contained objects for an identified right of content usage. In this conventional arrangement, however, the viewer may not view the premium content outside the home because the object for an identified right of content usage only resides on the STB. The premium content rights object transfer process described below allows the viewer, for example, to view the premium content on another premium content reproduction device 13A, 13B by transferring the rights object from the STB to the other device. The examples discussed below allow transfer of rights so that a user may view content on other devices and/or at other locations, using their existing subscription rights.

In one scenario, the viewer of premium content may desire to change the location of viewing the premium content, for example, from the premium content reproduction device 13A at home to another premium content reproduction device 13B at another location. Premium content reproduction device 13A, 13B may be, for example, a PC or tablet computer as described further below in relation to FIG. 7. Alternatively, premium content reproduction device 13A, 13B may be, for example, a television or a set top box for use in conjunction with a television or other display device. Premium content reproduction device 13A, 13B may be, for example, enabled for wired network communications or wireless network communications. Premium content reproduction device 13A, 13B may also be, for example, enabled for near field communication (NFC) as described further below in relation to FIG. 5.

The premium content rights object transfer process may, for example, utilize a mobile device 11 to facilitate the transfer of the object for the identified right of content usage from the premium content reproduction device 13A to another premium content reproduction device 13B. The mobile device 11 may be, for example, a smartphone, tablet computer, or other portable device as described further below in relation to FIG. 5. Alternatively, the mobile device 11 may be, for example, any portable device with communication capabilities, e.g. iPod or other mp3 player, handheld video game, or the like. In some examples, mobile device 11 also functions as a premium content reproduction device 13A, 13B. In other examples, mobile device 11 cannot function as a premium content reproduction device 13A, 13B, but instead only facilitates the transfer of the object for the identified right of content usage.

Figure 2:
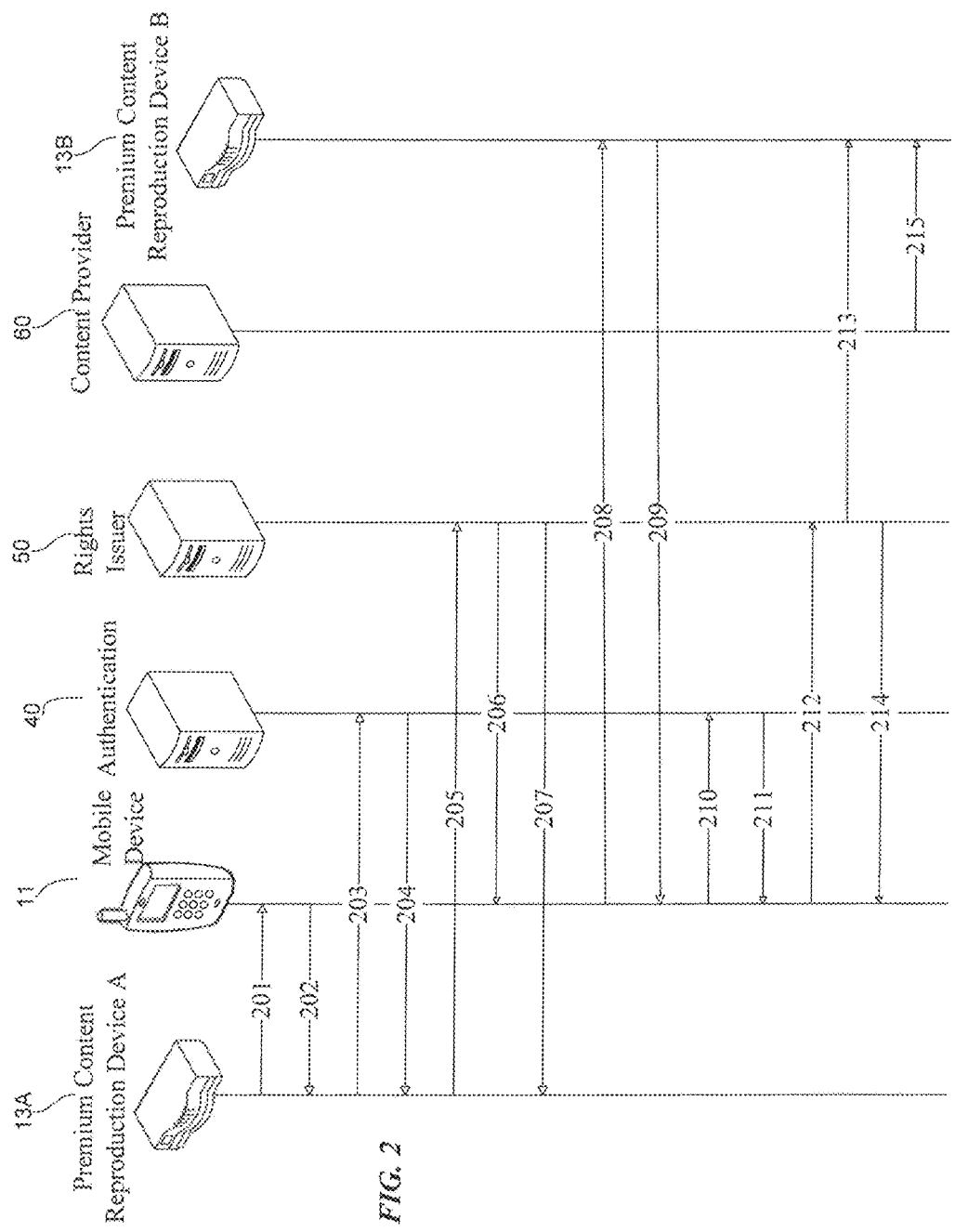
FIG. 2 is a high-level process flow that shows a process flow of an example of transferring a content right from a premium content reproduction device A to a mobile device and from the mobile device to a premium content reproduction device B in the system of FIG. 1.

FIG. 2 illustrates the transfer of an object for an identified right of content usage from a premium content reproduction device 13A to a mobile device 11. The object for an identified right of content usage represents the ability and authority for a user to utilize a premium content reproduction device 13A, 13B to reproduce premium content for viewing by the user. The object for an identified right of content usage may be, for example, a digital rights management (DRM) rights object (RO), a subscription file stored in a CableCARD, or encrypted information stored in a secure element. The object for an identified right of content usage may relate, for example, to premium content that represents a single channel (e.g. HBO), premium content that represents a collection of channels (e.g. HBO and Showtime), or premium content that represents all channels available to the premium content reproduction device 13A, 13B.

In the example of a process flow shown by the arrows in FIG. 2, the object for the identified right of content usage is a DRM RO. In this example, the user brings the mobile device 11 into communications with the home premium content reproduction device 13A via local network 12A. The communications between the mobile device 11 and each premium content reproduction device 13A, 13B may use wired network communications or wireless network communications such as NFC, as described in relation to FIG. 1. After communications are established, the mobile device 11 and the premium content reproduction device 13A implement a DRM RO transfer. The DRM RO transfer may follow, for example, the Open Mobile Alliance (OMA) DRM specification.

In this first example, as part of the communications between the mobile device 11 and premium content reproduction device 13A over local network 12A (e.g. NFC), the home premium content reproduction device 13A queries the mobile device 11, at 201, for an identifier of the mobile device 11. The mobile device 11 returns an identifier, at step 202, via the local communication between devices 11 and 13A. For example, the premium content reproduction device 13A queries the mobile device 11, at 201, for the PublicID-M of the mobile device 11 and the mobile device 11 returns the PublicID-M at step 202. The PublicID-M may be, for example, a string assigned by the manufacturer of the mobile device 11, the user of the mobile device 11, the content provider 60 of the premium content, or some other third party. The PublicID-M may also be, for example, the mobile telephone number (MTN) or mobile directory number (MDN) of the mobile device 11. Alternatively, the PublicID-M may be, for example, a digital certificate, as is well known in the art.

The premium content reproduction device 13A will have communications with various pieces of service provider equipment, for example, to receive content from source equipment at a service provider's "headend." Part of such communications relate to management of rights to decode and present premium content. For purposes of this type, the device 13A can communicate through network(s) 15 with servers such as 40, 50 and 60. Although not shown as a separate step, after step 201, the device 13A will establish communication with the authentication server 40. If the network technology supports persistent sessions, the device 13A could alternatively use a previously established session to communicate with the server 40.

In the next step (203), the premium content reproduction device 13A uses the communication with authentication server 40 to submit, via network(s) 15, the mobile device identifier, e.g. PublicID-M; and an identifier of the premium content reproduction device 13A to the authentication server 40 at step 203. The premium content reproduction device identifier may be, for example, a DeviceID-A of the premium content reproduction device 13A. The DeviceID-A may be, for example, a serial number or some other fixed string assigned by the manufacturer of the premium content reproduction device 13A. In this example, the ID submission may use a message format in accordance with the OMA DRM standard.

The authentication server 40 determines, at step 204, based on the premium content reproduction device identifier, e.g. DeviceID-A; and the mobile device identifier, e.g. PublicID-M; received in step 203, if the mobile device 11 is authorized to facilitate the transfer of the DRM RO from device 13A. In this example, the authorization determination in 204 is automatic. Such automatic authorization is, for example, based on pre-registration and/or other information contained in an account record associated with the user, as described further in relation to FIG. 4 below. However, additional security steps may be added, some of which may entail prompting for, receiving and validating user input (e.g. of a username and/or a password).

If transfer using the mobile device 11 is authorized, the authentication server 40 notifies the premium content reproduction device 13A, via network(s) 15, of such authorization as part of step 204. For example, the authentication server 40 responds to the submission requesting authorization from step 203 by sending back through network(s) 15 a response message in a standard OMA DRM format indicating successful authorization and therefore authorizing the desired rights transfer. Although not separately shown, the content reproduction device 13A and/or the mobile device 11 may provide a visible or audible output to notify the user of the successful outcome.

If not authorized, a failure notification and an opportunity to re-try a limited number of times may be provided to the user via mobile device 11. For example, if the authorization by authentication server 40 fails, e.g. because the mobile device 11 is not authorized for the desired type of rights transfer, then a message in a standard OMA DRM format may be sent back from the authentication server 40 to the premium content reproduction device 13A denying the rights transfer. In response to such a failure notification, the premium content reproduction device 13A and/or the mobile device 11 may provide a visible or audible output to notify the user of the transfer denial and possibly advising of further options (e.g. re-try, subscription upgrade or the like).

For purposes of further discussion of FIG. 2, we will assume that the determination in step 204 is successful, and therefore, that the authentication server 40 sent back an indication of authorization to the premium content reproduction device 13A. Hence, in step 205, the premium content reproduction device 13A directs, via network(s) 15, using a message in a standard OMA DRM format, the RI 50 to deliver a copy of the DRM RO to the mobile device 11. The RI 50, in step 206, delivers, via network(s) 15, using a message in a standard OMA DRM format, the DRM RO copy to the mobile device 11 and informs, via network(s) 15, using a message in a standard OMA DRM format, the premium content reproduction device 13A, at step 207, that the copy of the DRM RO has been delivered to the mobile device 11. As part of step 207, the premium content reproduction device 13A deletes the original DRM RO from rights object storage in the premium content reproduction device 13A. At this point, premium content reproduction device 13A may continue to store, for example, other ROs related to other premium content and a user can continue to view the other premium content on premium content reproduction device 13A. The user, however, is not able to view the premium content related to the now deleted DRM RO, unless the DRM RO is moved back to premium content reproduction device 13A.

Once the mobile device 11 has a copy of the DRM RO, the user may move, with the mobile device 11, to another location. In some situations, mobile device 11, for example, provides notification to the user (e.g. message displayed on the screen of the mobile device 11) that the right is contained in mobile device 11. FIG. 2 further illustrates the transfer of the DRM RO from a mobile device 11 to a premium content reproduction device 13B. After arriving at the new location, the user may bring the mobile device 11 into communications with another premium content reproduction device 13B via local network 12B. The communications may be, for example, via near field communications, wired communications or wireless communications.

As part of the communications between the mobile device 11 and the other premium content reproduction device 13B over local network 12B (e.g. NFC), the mobile device 11 queries the other premium content reproduction device 13B, at step 208, for an identifier of the other premium content reproduction device 13B. The other premium content reproduction device 13B returns the identifier to the mobile device 11 at step 209 via the local communication between devices 11 and 13B. For example, the mobile device 11 may query the other premium content reproduction device 13B via local network 12B, at 208, for the PublicID-B of the other premium content reproduction device 13B and the other premium content reproduction device 13B returns the PublicID-B to the mobile device 11 at step 209. The PublicID-B may be, for example, a string assigned by the manufacturer of the premium content reproduction device 13B, the user of the premium content reproduction device 13B, the content provider 60 of the premium content, or some other third party. The PublicID-B may be, for example, a digital certificate, of a known format or type.

In the next step (210), the mobile device 11 uses the communications with the authentication server 40 to submit the other premium content reproduction device identifier, e.g. PublicID-B; and a mobile device identifier to the authentication server 40 via network(s) 15, at step 210. The mobile device identifier may be, for example, a DeviceID-M of the mobile device 11. The DeviceID-M may be, for example, a serial number or some other fixed string assigned by the manufacturer of the mobile device 11. In this example, the ID submission may use a message format in accordance with the OMA DRM standard.

The authentication server 40 determines, at step 211, based on the premium content reproduction device identifier, e.g. PublicID-B; and the mobile device identifier, e.g. DeviceID-M; received in step 210, if the premium content reproduction device 13B authorized to receive a copy of the DRM RO. In this example, the authorization determination in 204 is automatic. Such automatic authorization is, for example, based on pre-registration and/or other information contained in an account record associated with the user, as described further in relation to FIG. 4 below. However, additional security steps may be added, some of which may entail prompting for, receiving and validating user input (e.g. of a username and/or a password).

If transfer from the mobile device 11 to the premium content reproduction device 13B is authorized, the authentication server 40 notifies, as part of step 211, the mobile device 11 of such authorization via network(s) 15. For example, the authentication server 40 responds to the submission requesting authorization from step 210 by sending back through network(s) 15 a response message in a standard OMA DRM format indicating successful authorization and therefore authorizing the desired rights transfer. Although not separately shown, the content reproduction device 13B and/or the mobile device 11 may provide a visible or audible output to notify the user of the successful outcome.

If not authorized, authentication server 40 may notify the mobile device 11 of such failure and provide an opportunity to retry some limited number of times. Such authorization failure notification may be output to the user via mobile device 11. For example, if the authorization by authentication server 40 fails, e.g. because the premium content reproduction device 13B is not authorized for the desired type of rights transfer, then a message in a standard OMA DRM format may be sent back from the authentication server 40 to the mobile device 11 denying the rights transfer. In response to such a failure notification, the premium content reproduction device 13B and/or the mobile device 11 may provide a visible or audible output to notify the user of the transfer denial and possibly advising of further options (e.g. re-try, subscription upgrade or the like).

For purposes of further discussion of FIG. 2, we will assume that the determination in step 211 is successful, and therefore, that the authentication server 40 sent back an indication of authorization to the mobile device 11. Hence, in step 212, the mobile device 11 directs, via network(s) 15, using a message in a standard OMA DRM format, the RI 50 to deliver a copy of the DRM RO to the other premium content reproduction device 13B. The RI 50, in step 213, delivers, via network(s) 15, using a message in a standard OMA DRM format, the DRM RO copy to the other premium content reproduction device 13B and informs, via network(s) 15, using a message in a standard OMA DRM format, the mobile device 11 that the copy of the DRM RO has been delivered to the other premium content reproduction device 13B at step 214. As part of step 214, the mobile device 11 deletes the DRM RO from the rights object storage in the mobile device 11. The user then decides to view the premium content and requests the other premium content reproduction device 13B to display the premium content. The other premium content reproduction device 13B, in step 215, will then retrieve the premium content from the content provider 60 for display to the user.

Instead of directing the RI 50 to deliver, via network(s) 15, a copy of the DRM RO to the other premium content reproduction device 13B at step 212, mobile device 11 may retain the copy of the DRM RO on the mobile device 11 and allow the user to view the premium content on the mobile device 11.

After the user views the premium content on the other premium content reproduction device 13B, the user may initiate a process to move the DRM RO back to the original premium content reproduction device 13A. This may be accomplished, for example, by following the process flow of FIG. 2 and exchanging premium content reproduction device 13B and premium content reproduction device 13A in the appropriate process steps. Alternatively, the DRM RO may contain, for example, a limited period of validity after which the premium content may not be viewed. The limited period of validity, for example, is defined as part of the OMA DRM standard. Such limited period of validity may be based on, for example, a number of hours or days for which the DRM RO is valid, a number of times that the premium content may be viewed, or a date or time after which the DRM RO is no longer valid. The period of validity may vary based on the user and the user's permissions (e.g. basic service subscription vs. upgraded service subscription); the other premium content reproduction device 13B (e.g. limited capabilities vs. full featured capabilities); the location; and/or some combination of these criteria. After the limited period of validity, the other premium content reproduction device 13B may, for example, delete the DRM RO and notify the RI 50 of such deletion.

Figure 3:
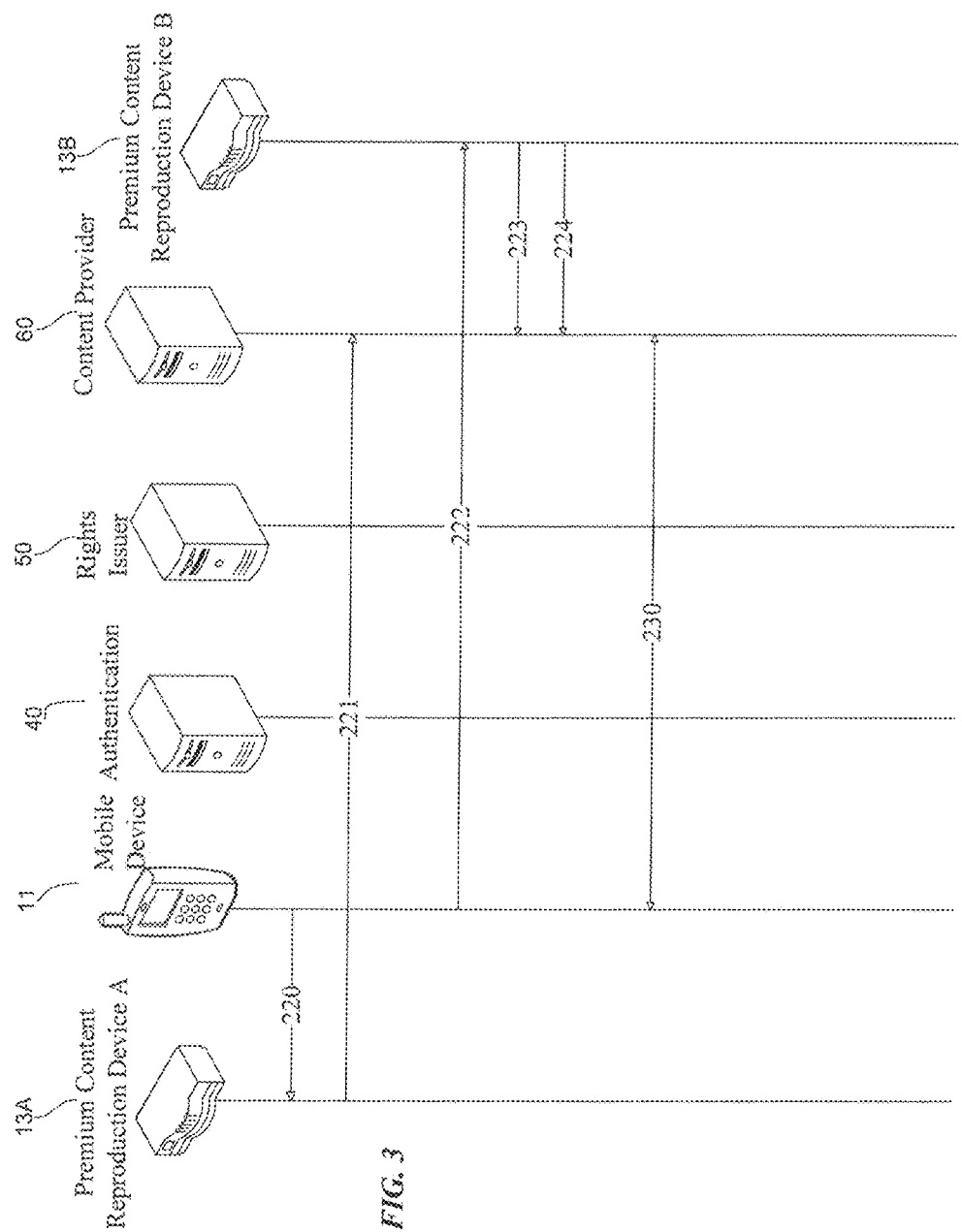
FIG. 3 is a high-level process flow similar to FIG. 2 but showing a somewhat different example of a process flow for transferring a content right from the premium content reproduction device A to the mobile device and from the mobile device to the premium content reproduction device B in the system of FIG. 1.

FIG. 3 illustrates an alternative procedure for the transfer of an object for an identified right of content usage from a premium content reproduction device 13A to a mobile device 11. In this example, the premium content reproduction device 13A and the other premium content reproduction device 13B may utilize, for example, CableCARD content protection pursuant to the CableCARD 2.0 specification.

CableCARD content protection may use, for example, a CableCARD or M-Card connected to the premium content reproduction device 13A and the other premium content reproduction device 13B. CableCARD or M-Card refers to a special-use PCMCIA (PC) card for connection to a reproduction device that allows a user to view and record premium content on a premium content reproduction device 13A, 13B without requiring other equipment specifically provided by a cable television company.

A user may bring, for example, a mobile device 11 into communications with, for example, the premium content reproduction device 13A via local network 12A. The communications may be, for example, via near field communications, wired communications or wireless communications. As part of the communications between premium content reproduction device 13A and mobile device 11 over local network 12A (e.g. NFC), the mobile device 11 delivers, at step 220, a mobile device identifier to the premium content reproduction device 13A via local network 12A. For example, the mobile device 11 delivers the PublicID-M of the mobile device 11. The PublicID-M may be, for example, a string assigned by the manufacturer of the mobile device 11, the user of the mobile device 11, the content provider 60 of the premium content, or some other third party. The PublicID-M may be, for example, the mobile telephone number (MTN) or mobile directory number (MDN) of the mobile device 11. The PublicID-M may be, for example, a digital certificate, as is well known in the art.

In the next step (221), the premium content reproduction device 13A disables, per the CableCARD 2.0 specification, the desired subscription and informs, at step 221, the content provider 60, via network(s) 15, that the subscription has been disabled. The user may then move, with the mobile device 11, to a new location.

After the user arrives at the new location, the user brings the mobile device 11 into communications with the other premium content reproduction device 13B via local network 12B. At this point, the mobile device 11 signals via local network 12B, at step 222, the other premium content reproduction device 13B that the subscription is to be moved to the other premium content reproduction device 13B and the other premium content reproduction device 13B disables, per the CableCARD 2.0 specification, an existing subscription. The other premium content reproduction device 13B then informs, at step 223, the content provider 60, via network(s) 15, that a current subscription of the other premium content reproduction device 13B is disabled. The other premium content reproduction device 13B also requests via network(s) 15, at step 224, the content provider 60 to enable, per the CableCARD 2.0 specification, the desired subscription on the other premium content reproduction device 13B. The request to enable, at 224, the desired subscription includes, for example, subscription information and the identifier of the mobile device 11, e.g. PublicID-M. The user may then view the premium content on the other premium content reproduction device 13B.

In this way, the object for an identified right of content usage is transferred out of premium content reproduction device 13A by disabling the subscription in premium content reproduction device 13A and is transferred to premium content reproduction device 13B by enabling the subscription in premium content reproduction device 13B. However, in this procedure, the mobile device 11 facilitates those transfers but did not itself receive or store the relevant object. Premium content reproduction device 13B can reproduce premium content based on the transferred object, but the mobile device 11 cannot.

After the user views the premium content on the other premium content reproduction device 13B, the user may initiate a process to move the desired subscription back to the original premium content reproduction device 13A. This may be accomplished, for example, by following the process flow of FIG. 3 and exchanging premium content reproduction device 13B and premium content reproduction device 13A. Alternatively, the subscription may be, for example, associated with a limited period of validity, after which the premium content may not be viewed. Such limited period of validity may be based on, for example, a certain number of hours or days for which the subscription is valid, a certain number of times that the premium content may be viewed, or a certain date or time after which the subscription is no longer valid. After the limited period of validity, the other premium content reproduction device 13B may, for example, disable the subscription and notify the content provider 60 that the subscription was disabled.

In the various previous examples, NFC consistently has been shown as the communications type via both of local networks 12A, 12B. However, no such requirement exists related to the processes of FIGS. 2 and 3. Local network 12A, for example, may be over Wi-Fi while local network 12B, for example, is NFC, or vice versa. Other aspects of the two processes of these examples may be combined and/or substituted.

In still another approach (not shown), near field communications may be used to deliver the right to view the premium content directly between the home premium content reproduction device 13A and the mobile device 11, as well as the mobile device 11 and the other premium content reproduction device 13B. In this approach, the mobile device 11 is brought into close proximity to the premium content reproduction device 13A and communications are established via near field communications, as further described below in relation to FIG. 5. As part of the near field communications, the mobile device 11 and the premium content reproduction device 13A perform mutual authentication and the premium content reproduction device 13A determines if the mobile device 11 is authorized to receive the right to view the premium content. Such determination of authorization may be, for example, based on a message exchange between the premium content reproduction device 13A and the authentication server 40 via network(s) 15. The message exchange may include the PublicID-M of the mobile device 11 and the DeviceID-A of the premium content reproduction device 13A, as described above in relation to FIGS. 2 and 3.

If the mobile device 11 is authorized, the premium content reproduction device 13A delivers the right to view the premium content directly via near field communications to the mobile device 11. After the premium content reproduction device 13A delivers the right to view the premium content directly to the mobile device 11, the premium content reproduction device 13A deletes the right to view the premium content from the premium content reproduction device 13A and the mobile device 11 stores the right to view the premium content in a secure element 137 of the mobile device 11. In some situations, mobile device 11, for example, provides notification to the user (e.g. message displayed on the screen of the mobile device 11) that the right is contained in mobile device 11. The user may then move, with the mobile device 11, to a new location.

After the user arrives at the new location, the mobile device 11 is then brought into close proximity with the other premium content reproduction device 13B and communications are established via near field communications. The mobile device 11 and the other premium content reproduction device 13B mutually authenticate and the mobile device 11 determines if the other premium content reproduction device 13B is authorized to receive the right to view the premium content. Such determination of authorization may be, for example, based on a message exchange between the mobile device 11 and the authentication server 40 via network(s) 15. The message exchange may include the PublicID-B of the premium content reproduction device 13B and the DeviceID-M of the mobile device, as described above in relation to FIGS. 2 and 3.

If authorized, the mobile device 11 delivers the right to view the premium content to the other premium content reproduction device 13B directly via near field communications. After the mobile device 11 delivers the right to view the premium content directly to the premium content reproduction device 13B, the mobile device 11 deletes the right to view the premium content from the secure element 137 of the mobile device 11 and the premium content reproduction device 13B stores the right to view the premium content. The user may then view the premium content on the other premium content reproduction device 13B.

Instead of transferring the right to view the premium content to the other premium content reproduction device 13B, the user may, for example, view the premium content on the mobile device 11, based on the right to view the premium content stored in the secure element 137 of the mobile device 11.

After the user views the premium content on the mobile device 11 or the other premium content reproduction device 13B, the user may initiate a process to move the right to view premium content back to the original premium content reproduction device 13A. This may be accomplished, for example, by transferring the right directly from the premium content reproduction device 13B to the mobile device 11 and from the mobile device 11 to the premium content reproduction device 13A. Such transfers would include establishment of communications, mutual authentication and authorization as previously described. Alternatively, the right to view premium content may be, for example, associated with a limited period of validity, after which the premium content may not be viewed. Such limited period of validity may be based on, for example, a certain number of hours or days for which the right to view premium content is valid, a certain number of times that the premium content may be viewed, or a certain date or time after which the right to view premium content is no longer valid. After the limited period of validity, the other premium content reproduction device 13B may, for example, delete the right to view the premium content and notify the content provider 60 that the subscription was disabled.

Figure 4:
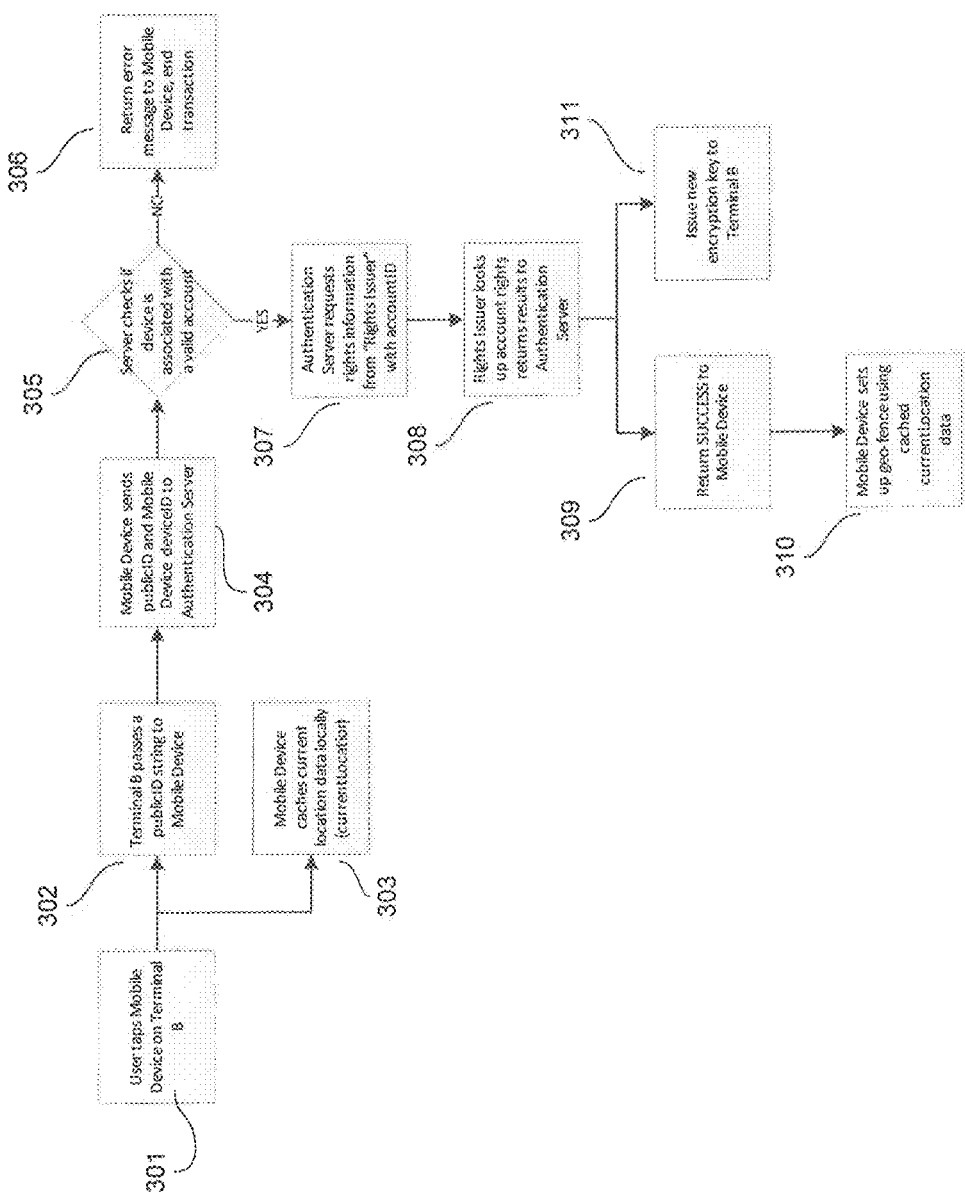
FIG. 4 is an example of a flow chart depicting steps of moving the content right from the mobile device to the premium content reproduction device B, as in FIG. 2, in somewhat more detail.

FIG. 4 illustrates an example of a flow chart depicting, in greater detail, steps of moving the content right from the mobile device 11 to the premium content reproduction device 13B, as depicted in each of FIGS. 2 and 3 and described in the various examples above. In step 301, the user taps the mobile device 11 on or brings the mobile device 11 into close proximity of the premium content reproduction device 13B in order to establish near field communications between the mobile device 11 and the premium content reproduction device 13B. In step 302, the premium content reproduction device 13B passes, via the established near field communications, the PublicID-B string of the premium content reproduction device 13B to the mobile device 11. In step 303, the mobile device 11 caches current location data locally. Current location data may be obtained by the mobile device 11 in several ways as further described below in relation to FIG. 5. In step 304, the mobile device 11 sends, via network(s) 15, the PublicID-B string of the premium content reproduction device 13B and the DeviceID-M of the mobile device 11 to the authentication server 40.

In step 305, the authentication server 40 checks, based on the PublicID-B string of the premium content reproduction device 13B and the DeviceID-M of the mobile device 11, if the premium content reproduction device 13B is associated with a valid account. For example, the authentication server 40 may query an account database for any account record that contains both the DeviceID-M of the mobile device 11 and the PublicID-B of the premium content reproduction device 13B. The query may, for example, return an AccountID of the account record that contains both the mobile device 11 DeviceID-M and the premium content reproduction device 13B PublicID-B. If the premium content reproduction device 13B is not associated with a valid account (e.g., query does not return an AccountID), the authentication server 40 returns an error message to the mobile device 11, in step 306, and the transaction ends.

If the premium content reproduction device 13B is associated with a valid account (e.g., query does return an AccountID), the authentication server 40 requests rights information from the RI 50 in step 307. The request for rights information from the RI 50 includes the AccountID of the valid account. In step 308, the RI 50 looks up the rights information based on the AccountID and returns the results to the authentication server 40. In this scenario, the authentication server 40 may, for example, validate that the premium content reproduction device 13B is associated with a valid account and the RI 50 may, for example, determine that the account has a right to view the premium content.

The authentication server 40, in step 309, sends a success message to the mobile device 11 and, in step 310, the mobile device establishes a geo-fence using the cached location data from step 303. Alternatively, such geo-fence is configured, for example, in advance by the user based on knowledge of the destination (e.g. user has an existing reservation for a particular hotel). Such geo-fence may establish a virtual perimeter around the premium content reproduction device 13B and the mobile device 11. For example, the user may leave the geo-fenced area with the mobile device 11, at which point the premium content reproduction device 13B may no longer be able to reproduce the premium content. As further example, the mobile device 11 leaving the geo-fenced area may prompt a notification to be sent to the premium content reproduction device 13B to immediately delete or disable the object for an identified right of content usage. Such notification may be sent, for example, by the mobile device 11, by the RI 50, or by the content provider 60, based on whether the right object is a DRM RO, a CableCARD subscription, or encrypted information previously exchanged via NFC and stored in a secure element.

In step 311, the authentication server 40 issues a new encryption key and delivers the new encryption key to the premium content reproduction device 13B. The new encryption key may be, for example, used by the premium content reproduction device 13B to decrypt the encrypted information exchanged via NFC between the mobile device 11 and the premium content reproduction device 13B and stored in a secure element of the premium content reproduction device 13B. Alternatively, the new encryption key may be used to enable the moved subscription in relation to the process of FIG. 3 or may be used in conjunction with the DRM RO of the process of FIG. 2.

The various methods and processes of transferring an identified right to view premium content have been described by way of example, only. Although the various examples depict utilizing the described processes to restore the right to an original location, it may be that the right reverts to the original location in a different manner, e.g. as the result of a time out. For example, if the premium content has not been viewed within a specified amount of time or, if after use, the right has not been restored within a specified amount of time, then the right may be restored to the original location by any one and/or a combination of various elements, such as those in FIG. 1. In one example, after a DRM RO has been transferred to the other premium content reproduction device 13B, it may be that the premium content has been viewed, but the DRM RO has not been transferred back to premium content reproduction device 13A within the defined period. In this example, premium content reproduction device 13A, mobile device 11, and/or RI 50 may contain a time out value that tracks restoration of the DRM RO to premium content reproduction device 13A. If such restoration does not occur within the time out value, premium content reproduction device 13A and/or mobile device 11 may prompt RI 50 to deliver a new copy of the DRM RO to premium content reproduction device 13A. In this way, the right may be restored after expiration of a time out value.

In the various examples, it may be desirable to provide a status and/or notification to the user as to the current state of any right being transferred. For example, the display of mobile device 11 may be used to provide a status message indicating mobile device 11 currently contains the right. In addition, such status message may indicate whether mobile device 11 has the ability to view the content or may only be used to transfer the content. As a further example, premium content reproduction device 13A may provide, via either a visual or audible alert, a notification that a right has been transferred to mobile device 11. The other premium content reproduction device 13B then may provide, via either a visual or audible alert, a notification that the right has been transferred thereto from mobile device 11. In this way, the user may be informed of the status of the right at various stages of any of the examples of transfer procedures.

Although various examples above indicate that mobile device 11 may be permitted to view the premium content, in other cases mobile device 11 may not be operated to offer a view of the premium content, either because mobile device 11 does not have the capabilities to display the content (e.g. a "feature" phone without content reproduction circuitry) or because mobile device 11 is not authorized to display the content (e.g. mobile device 11 is only allowed to transfer the right). In one such example, mobile device 11 may receive a DRM RO from RI 50, but mobile device 11 does not have the capability to interpret the DRM RO. Therefore, mobile device 11 may not be used to view the premium content. In another such example, mobile device 11 may have the capability to interpret the DRM RO, but is not authorized to view the premium content.

Figure 5:
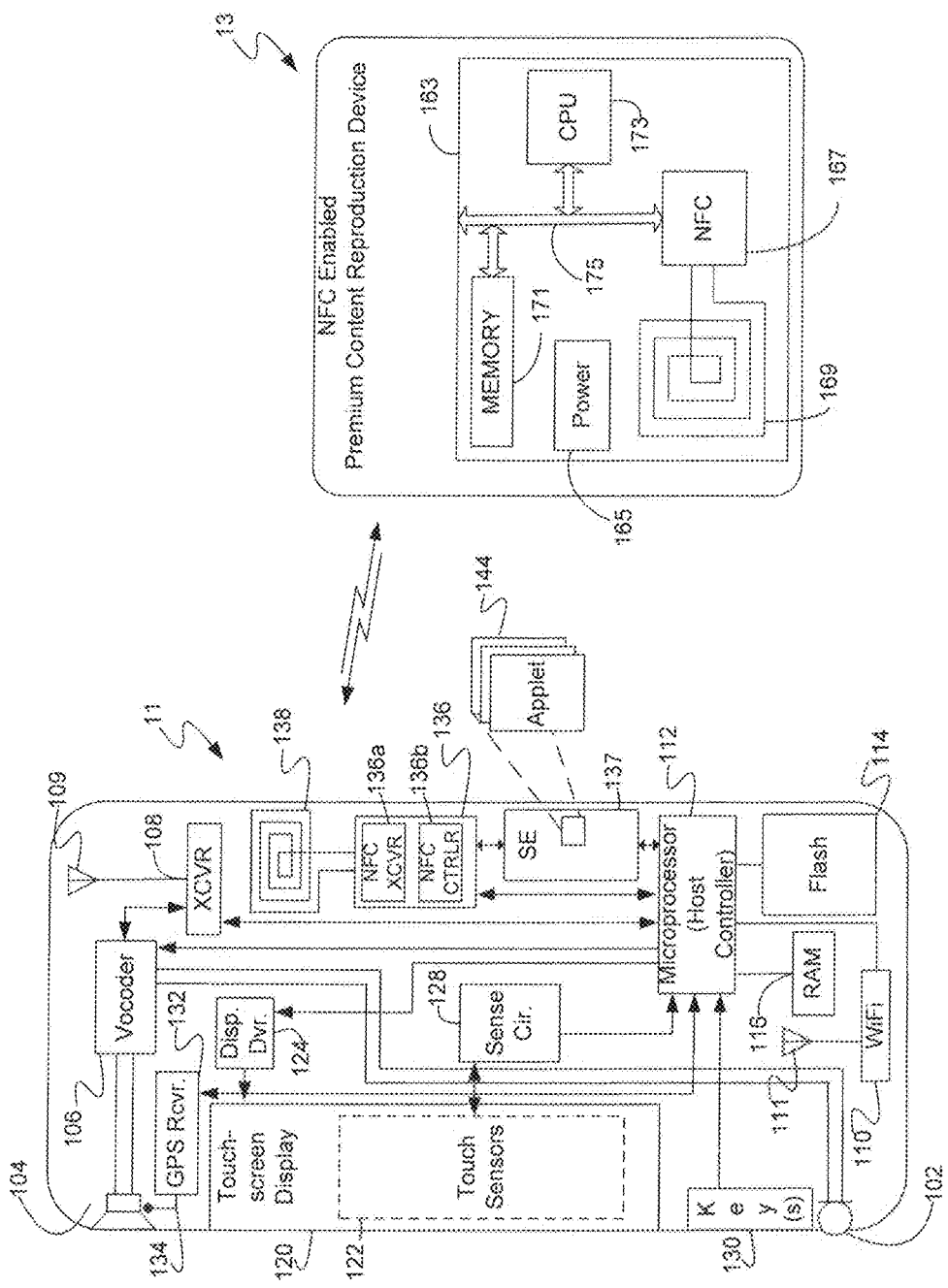
FIG. 5 is a high-level functional block diagram of examples of a mobile device and an NFC enabled device.

FIG. 5 illustrates a mobile device 11 and an NFC enabled device 13 as well as a relatively short range wireless communication between the mobile device 11 and an NFC enabled device 13. The NFC enabled device 13 represents a variety of NFC enabled devices, including premium content reproduction devices such as those described above in relation to FIGS. 2 and 3 and further described in relation to FIGS. 7 and 8, television consoles, set top boxes, and the like, which include an integrated NFC chipset 163. Alternatively, NFC chipset 163 may be a standalone "tag" which may be coupled to NFC enabled device 13, as further described later. The example uses a Near Field Communication (NFC) system in the mobile device 11 to communicate with the NFC enabled device 13, for example, to provide data to or receive information from the NFC enabled device 13. In examples of a process, the following steps may take place. At a high level, the user brings the NFC enabled mobile device 11 within proximity (e.g. 2 to 4 cm or less, although in some cases the distance may be up to 20 cm) of the NFC enabled device 13. An application installed on the mobile device 11 listens for NFC events and commences a contactless data flow by establishing communication with the NFC enabled device 13.

In a mode of operation, such as peer-to-peer (P2P), the mobile device 11 initiates a data exchange with another device (e.g., second NFC enabled mobile device). Such data exchange is defined in the ISO 18092 standard. In P2P mode, both devices (mobile device 11 and NFC enabled device 13 in this example) play a symmetric role in that both may generate a magnetic field and transmit and receive data. A typical use case for P2P communication is exchange of "business cards" between two handsets. Traditionally, such exchange is controlled by the host controller 112, without involvement of a security function, leaving the recipient of a payload potentially vulnerable to malware. However, the example uses the NFC controller 136b of the mobile device 11 to first determine whether a security function is required. If the security function is not required, the payload is sent to the host controller 112 for processing. However, if a security function is required, the payload from the NFC enabled device 13 is evaluated by the rule-set of the security element 137 before routing the information in the payload to the host controller 112. For example, only if the authentication criterion is met by the SE 137 does the NFC controller allow the host controller 112 to process the information from (or provide information to) the NFC enabled device 13. The authentication and the provisioning of the SE by a remote server is discussed in more detail in a later section.

Different NFC modes of operation may be implemented via a variety of types of mobile devices having a host controller 112, memory 116 and 114, NFC 136 with a security element 137, and an NFC enabled device 13, which often will also include a processor, memory and an RF (contactless) communication capability. It may be helpful to consider examples of a mobile device 11 and an NFC enabled device 13 in somewhat more detail.

FIG. 5 illustrates elements of the mobile device 11 and elements of the NFC enabled device 13 in functional block diagram form, at a relatively high level. First, we will consider the mobile device 11.

It should be appreciated that the disclosed subject matter may be implemented using any mobile computing device having NFC communication capability, and/or mobile or other wireless communication capability, configured to use those capabilities to conduct mobile transactions, e.g. data exchange regarding rights transfers, as discussed herein. In the example of FIG. 5, the mobile device 11 is in the form of a smart phone type mobile handset including a touch screen display 120. Examples of touch screen type mobile devices that may be used to implement mobile device 11 may include (but are not limited to) a smart phone, personal digital assistant (PDA), tablet computer or other portable device with NFC capability. However, the structure and operation of the touch screen type mobile device 11 is provided by way of example; and the subject technology as described herein is not intended to be limited thereto. For purposes of this discussion, FIG. 5 provides a block diagram illustration of the exemplary mobile device 11 having a touch screen display for displaying content and receiving user input as (or as part of) the user interface.

Although the rights transfer transactions that are the focus of discussions here utilize data communications, a typical mobile device such as the exemplary smart phone 11, also supports voice communications. Hence, in the example shown in FIG. 5, the mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 5, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 11.

On-line transaction related communications involving information obtained from the NFC enabled device 13, for example, often utilize Internet Protocol (IP) packet data transport utilizing the digital wireless transceiver (XCVR) 108 and over the air communications to and from base stations of the serving mobile network. Such communications may include specific account related data and security information from the mobile device 11, as well as payload information received from an NFC enabled device 13 during a particular transaction. Accordingly, such wireless transaction data communications may include at least some of the data obtained from the NFC enabled device 13.

In one example, the transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). Although transaction communications involving account data obtained from the NFC enabled device 13 typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 5, for packet data communications, the exemplary mobile device 11 may also include a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications related to transactions involving data obtained from the NFC enabled device 13.

The mobile device 11 further includes a microprocessor, sometimes referred to herein as the host processor 112, which serves as a programmable controller for mobile device 11 by configuring mobile device 11 to perform various operations, for example, in accordance with instructions or programming executable by processor 112. For example, such operations may include various general operations of the mobile device 11 as well as operations related to the communication with the NFC enabled device 13 and conducting related rights transfer transactions as described herein. A flash memory 114 is used to store, for example, programming or instructions for execution by the processor 112. Depending on the type of device, the mobile device 11 stores and runs an operating system through which specific applications may be run on the device. Examples of operating systems include Android, Apple iOS (iPhone or iPad devices), Windows Mobile, RIM BlackBerry operating system, or the like. Flash memory 114 may also be used to store mobile configuration settings for different mobile applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 13 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting P2P and related rights transfer transaction communications of the type under consideration here may include a variety of different types of user interface elements. For discussion purposes, in the smart phone example shown in FIG. 5, the user interface elements of mobile device 11 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to the transaction processing and communication, as described herein.

For output, touch screen display 120 is used to present information (e.g., text, video, graphics or other visible content) to the user of mobile device 11. Host processor 112 controls visible display output on the LCD or other display element of the touch screen display 120 via a display driver 124, to present the various visible outputs to the device user. For example, some of the transaction related programming may cause the processor 112 to operate the driver 124 to cause screen 120 to display premium content and allow the mobile device 11 to function as a premium content reproduction device 13A, 13B.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

As shown in FIG. 5, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 11 provide output to and receive input from the user of the mobile device 11, for any of the various functions, operations or applications of the device. For example, programming (discussed more later) that configures the mobile device 11 to obtain and act on information from the NFC enabled device 13 and causes the mobile device to perform a security function may include further acknowledgment requests from the user. For example, the mobile device 11 may present the results of the authorization step as described above in relation to FIGS. 2 and 3.

Many implementations of mobile devices today support location based services, which are quite popular now, particularly with smart phone and tablet users. Location information today may be used in a variety of services/applications. Of note for purposes of this discussion, some uses or transactions involving account or other information obtained from or provided to the NFC enabled device 13 may also involve location determination. For example, the location information of the NFC enabled device 13 may be part of the information provided to the security element 137 or to a remote server (e.g., authentication server 40 discussed above) to determine the authenticity of the mobile device 11 and/or the NFC enabled device 13. By way of just one example, at this point in our discussion, the current location of the device 13 may be recorded in memory of the device and/or communicated to a server or other equipment involved in a rights transfer transaction, when the mobile device communicates over a network (e.g. to conduct a transaction) using the information obtained from the NFC enabled device 13. As an additional example, location information as described herein may be used to establish a geo-fence as discussed above.

There are a variety of ways that a mobile device 11 may be configured to obtain information as to current location of the device. In our example, the mobile device 11 includes a global positioning satellite (GPS) receiver 132 and associated antenna 134. GPS is a space-based satellite navigation system that provides location and time information anywhere on Earth, where there is an unobstructed line of sight to at least three, or more of the GPS satellites.

The mobile device 11 also has NFC communication capability. NFC may be used for a variety of different functions or applications of the mobile device 11. However, for purposes of this discussion, the mobile device 11 interacts with the NFC enabled device 13 via the NFC communication capability of the mobile device 11. NFC is a set of standards for smart phones and similar devices, such as the exemplary mobile device 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.,) includes a transceiver configured to communicate with other NFC capable equipment.

Hence, the exemplary mobile device 11 further includes an NFC sensor. The NFC sensor may be implemented in a variety of ways. In the exemplary mobile device 11 of FIG. 5, the NFC sensor includes an NFC type radio frequency transceiver 136a, which is formed by an NFC chipset 136. The NFC chipset 136 provides two-way wireless communication of information in accordance with NFC technology and protocols. The NFC chipset 136 includes an NFC controller 136b. For simplicity, the NFC 136 is sometimes referred to herein as the NFC controller 136, while it will be understood that it is a controller within the NFC chipset 136. The exemplary NFC sensor also includes an antenna, such as coil antenna 138. The NFC chipset 136 of device 11 connects to the NFC coil antenna 138, for transmitting and receiving NFC communications to/from other NFC compatible devices with compatible transceivers over short air link distances. The transceiver 136a formed by the NFC chipset 136 also sends and receives a variety of signaling messages for establishing NFC links with other NFC-enabled devices and sends and receives various user data over the established NFC links. The signaling, for example, may allow the transceiver formed by the NFC chipset 136 to detect proximity of another NFC capable device, establish an NFC link with the other device, trigger execution of an appropriate application, such as an application to support the premium content right transfer process described above, within the mobile device 11 and send and/or receive data for the rights transfer application as between the mobile device 11 and the other NFC capable device. Some modern mobile devices are already coming equipped with such NFC equipment, and increased NFC deployment is expected in the near future.

In order to run secure applications such as transferring the right to view premium content and the like, there is a Secure Element (SE) 137. In one example, the SE 137 is a separate chip that includes tamperproof storage and execution memory and is configured to communicate with an NFC controller 136b (a secure processor). The NFC controller 136b is different from the host processor 117 in that it focuses on enabling secure transactions. The SE 137 contains applications 144 (e.g., applets) that use secure keys running inside the secure processor. For example, there may be at least one applet 144 for processing of at least one type of communication, such as the rights transfer operations described above.

For example, the applications that run on the SE typically run on a Javacard operating system. The SE 137 may include various account information, such as account number, user identification, a personal identification number (PIN), or the like for user verification and possibly account balance and/or transaction record information. Likewise, the SE 137 may include the various forms of the object of an identified right of content usage, such as a DRM RO or other encrypted information. The SE 137 may be used to decode credentials of NFC enabled devices. In various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 136 is also configured such that transmissions to the NFC enabled device 13 are encrypted. In one example, communications between the SE 137 and the authentication server 40 may also be encrypted. Accordingly, the secure data storage and encrypted communication provide enhanced security and reduce the likelihood of fraud against a user's financial account.

In one example, the NFC controller 136 is configured to route all NFC traffic (e.g., data message from or sent to an NFC enabled device) through a SE 137. Put differently, the NFC controller 136 routes the NFC communication between the NFC system and the SE 137 without going to or from the host processor 112.

The logic implemented by the host processor 112 of the mobile device 11 configures the processor 112 to control various functions as implemented by the mobile device 11. The logic for a processor may be implemented in a variety of ways, but in our example, the processor logic is implemented by programming for execution by the microprocessor 112. Similarly, logic implemented by the NFC controller 136b configures the controller 136 to control various functions related to NFC communication. For example, one or more application programs are stored in the SE 137 memory for execution by the NFC controller 136b. Any application that is intended to utilize account related information obtained from the NFC enabled device 13 may include information stored in the SE 137 memory. For example, information in connection with a transaction with an NFC enabled device 13 is stored in the SE 137 memory, which when executed by the microprocessor 112 enables the mobile device 11 to perform transactions (e.g., transfer an object of an identified right of content usage) with the NFC enabled device 13 using the NFC sensor formed by the NFC chipset 136 and the associated antenna 138. As disclosed above, transactions that meet predetermined criteria (i.e., requiring a security function) are first routed through the SE 137.

The structure and operation of the mobile device 11, as outlined above, were described to by way of example, only.

The NFC enabled device 13 in our example includes a NFC chip 163, either as an integrated component or as a "tag" coupled to the NFC enabled device 13, as described earlier. The NFC chip 163 may, for example, include a power supply module 165, an NFC transceiver 167 and associated coil antenna 169, and one or more memories 171. The NFC chip 163 may or may not include a processor serving as the central processing unit (CPU) 173 of the chip 163 and a bus system 175. For example, a CPU may not be included if the NFC chip 163 is used as a tag. The NFC chip 163 may or may not include a battery or other internal power source. For example, instead of a power source, the power module 165 may collect energy at the time of a communication from the RF transmissions from the mobile device 11 via inductive coupling. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The NFC transceiver 167, for example, connects to the coil antenna 169, for transmitting and receiving RF communications to/from the NFC enabled mobile device 11. Hence, the chipset 136 of the mobile device 11 and NFC transceiver 167 of the NFC chip 163 are sufficiently compatible to enable the mobile device 11 to detect and communicate with an NFC enabled device 13. In one example, from the perspective of the NFC chip 163, the NFC enabled mobile device 11 can appear as a reader NFC enabled device. Put differently, the NFC enabled device 13 may act as a tag and the mobile device 11 may act as a reader when in read/write mode of operation.

The memory 171 of the NFC chip 163 stores data and/or executable programming for the CPU 173. In one example, the memory 171 may also include a key that is used for security purposes by the SE 137 of the mobile device 11. For example, this key may be provided by the authentication server 40 during premium content right transfer process. The NFC controller 136b of the mobile device, upon determining that a security feature is required, sends the payload to the SE 137 for authentication. Upon authentication, the NFC controller routes the payload (e.g., without the key) to the host controller 112 for processing.

The bus 175 supports signaling and transfer of data and/or instructions as between various elements on the chip 163 including the CPU 173, the memory 171 and the NFC transceiver 167. The memory 171 and programming execution by the CPU 173 provide data storage.

The structure and operation of the NFC enabled device 13, as outlined above, were described to by way of example, only.

As shown by the discussions above, aspects of the rights transfer techniques are implemented by configuration of processors in the devices 11, 13 and in servers like 40, 50, 60. Such configuration typically entails programming for the processors. We have discussed examples of the devices 11, 13, however, it may be helpful to briefly consider programmable computers, e.g. for server operations and/or for other types of end user or terminal devices.

Figure 6:
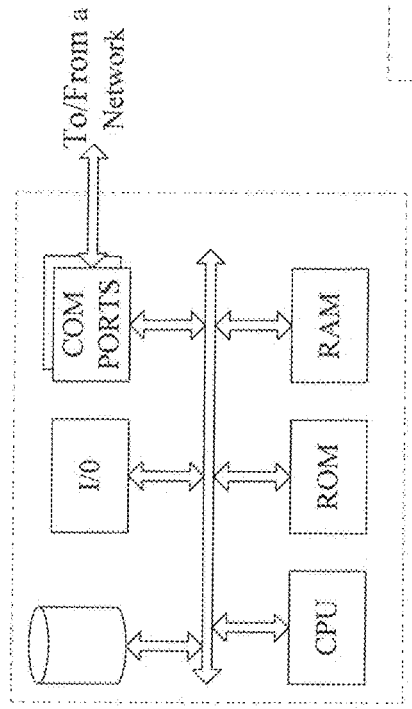
FIG. 6 is a simplified functional block diagram of a computer that may be configured as a host or server, for example, to function as the rights issuer in the system of FIG. 1.

FIGS. 6, 7 and 8 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. FIG. 8 depicts a computer, similar to the computer of FIG. 7, with content reproduction capabilities, as may be used to implement a set top box for use in conjunction with a television to display content received from a content provider 60. It is believed that the general structure and general operation of such equipment as shown in FIGS. 6, 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. A set top box, as in FIG. 8, may not include the same input and output elements as the computer of FIG. 7, but instead may include a television or other display for visual output and a remote control for input. The computer of FIG. 7 and set top box of FIG. 8 may also include content reproduction circuitry such that content received from a content provider 60 may be viewed via the output elements and controlled by the input elements. For example, content reproduction circuitry functions to receive premium content from content provider 60 and, in accordance with an identified right of content usage, either displays or restricts display of the premium content. Content as discussed herein includes audio, video, textual or other multimedia information. Such content is transported in digital format and often is encrypted. Circuitry to reproduce such content includes processing elements or the like to decrypt, decompress, and/or decode the received content data, if or as needed. The reproduction circuitry may also include components to convert the resulting decrypted/decompressed/decoded data to a signal format suitable to drive the applicable output device, e.g. the speaker(s) and/or the display device. In addition, the computer of FIG. 7 and the set top box of FIG. 8 may also include NFC capabilities as described in further detail in relation to FIG. 5 above. The hardware elements, operating systems and programming languages of such user terminal devices also are conventional in nature.

Hence, aspects of the methods of transferring premium content rights outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the content provider into the computer platform of the service provider that will be the authentication server and/or into a programmable implementation of an SE 137 or a device 11 or 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the terminals, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a earner wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurement, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a communication interface system, including at least one wireless communication transceiver and a near field communication (NFC) transceiver;
   at least one user interface element configured to receive user input and to provide output to a user of the mobile device; and
   a processor coupled to the communication interface system and the at least one user interface element, configured to implement functions, including functions to:
      establish, via the NFC transceiver, communication with a first premium content reproduction device, wherein the first premium content reproduction device comprises a set top box;
      send, via the NFC transceiver, a request related to an object for an identified right of content usage stored by the first premium content reproduction device, to the first premium content reproduction device, the request including an identifier of the mobile device for authentication;
      receive, via the at least one wireless communication transceiver, a message from a rights issuer (RI) of the object for the identified right of content usage as directed by the first premium content reproduction device based on successful authentication of the mobile device, wherein the message includes a copy of the object for the identified right of content usage;
      establish communication with a second premium content reproduction device;
      cache location data associated with the mobile device;
      obtain an identifier of the second premium content reproduction device and authenticate the second premium content reproduction device based on the obtained identifier;
      transfer, based on a successful authentication of the second premium content reproduction device, the copy of the object for the identified right of content usage to the second premium content reproduction device; and
      establish, using the location data, a geo-fenced area relative to the second premium content reproduction device, wherein upon exiting of the geo-fenced area by the mobile device causes the RI to instruct the second premium content reproduction device to delete the copy of the object for the identified right of content usage.

2. The mobile device of claim 1, wherein the function to establish communication with the first premium content reproduction device further comprises a function to:
   establish mutual authentication, via NFC, between the mobile device and the first premium content reproduction device prior to sending the request.

3. The mobile device of claim 1,
   wherein the function to establish communication with the second premium content reproduction device further comprises functions to:
      establish the communication via near field communication (NFC); and
      establish mutual authentication, via NFC, between the mobile device and the second premium content reproduction device.

4. The mobile device of claim 1, further comprising a secure element implemented in a Universal Integrated Circuit Card (UICC) or subscriber identity module (SIM) of the mobile device, wherein the implemented functions further include functions to:

receive the copy of the object for the identified right of content usage; and store the copy of the object for the identified right of content usage in the secure element.

5. The mobile device of claim 1, further comprising content reproduction circuitry, wherein the implemented functions further include functions to:

receive, based on another object for another identified right of content usage stored in the first premium content reproduction device, premium content from a content provider; and enable operation of the content reproduction circuitry to reproduce the received premium content, in accordance with the other identified right of usage using the other object for the other identified right of content usage.

6. The mobile device of claim 5, wherein the other object for the other identified right of content usage has a time-limited validity and the content reproduction circuitry is configured to not process further received premium content when the validity expires.

7. A premium content reproduction device, comprising:

a set top box, including:

a communication interface system including a wireless communication transceiver and a near field communication (NFC) transceiver;

a storage device configured to store an object for an identified right of content usage;

content reproduction circuitry configured to process received content for reproduction via an output device in accordance with the identified right of content usage; and a processor coupled to the communication interface system and the content reproduction circuitry, configured to implement functions, including functions to:

establish, via the NFC transceiver, an NFC communication with a mobile device;

receive, via the NFC transceiver and from the mobile device, a request including an identifier of the mobile device via the established NFC communication, wherein the request is associated with the object for the identified right of content usage;

send, via the wireless communication transceiver and upon successful authentication of the mobile device based on the identifier, a first message to a rights issuer (RI) of the object for the identified right of content usage, directing the RI to deliver a copy of the object for the identified right of content usage to the mobile device, the copy of the object for the identified right of content usage having a limited period of validity based on a geo-fenced area to be established by the mobile device;

delete, from the storage device, the object for the identified right of content usage in response to receiving, by the premium content reproduction device, a second message from the RI indicating delivery of the copy of the object for the identified right of content usage to the mobile device;

track an expiration of the limited period of validity based on the geo-fenced area; and prompt the RI to deliver a new copy of the object for the identified right of content usage when a restoration of the copy of the object for the identified right of content usage in the premium content reproduction device has not occurred by the expiration of the limited period of validity.

8. The premium content reproduction device of claim 7, wherein:

the object for the identified right of content usage is a Digital Rights Management (DRM) Rights Object (RO), and delivery of the copy of the DRM RO complies with the Open Mobile Alliance (OMA) Digital Rights Management (DRM) specification, and wherein the processor further implements functions to:

establish communication, by the premium content reproduction device, with the RI, wherein the RI is a DRM RI of the DRM RO;

send, by the premium content reproduction device and via the established communication with the DRM RI, the first message to the DRM RI directing the DRM RI to deliver the copy of the DRM RO to the mobile device;

enable the DRM RI to establish communication with the mobile device and deliver the copy of the DRM RO to the mobile device;

receive the second message from the DRM RI and via the established communication with the premium content reproduction device, informing the premium content reproduction device that the mobile device has received the copy of the DRM RO and requesting the premium content reproduction device to delete the DRM RO from the storage device; and delete, by the premium content reproduction device, the DRM RO from the storage device.

9. The premium content reproduction device of claim 7, wherein the storage device comprises a cableCARD, wherein the object for the identified right of content usage comprises a subscription file stored in the cableCARD and in response to the second message from the RI indicating the delivery of the copy of the subscription file to the mobile device, and wherein the processor further implements functions to:

disable, by the premium content reproduction device, the subscription file stored in the cableCARD;

establish communication, by the premium content reproduction device, with a provider of the premium content; and send a third message, by the premium content reproduction device and via the established communication with the provider of the premium content, informing the provider of the premium content that the subscription file was disabled the cableCARD in the premium content reproduction device.

10. The premium content reproduction device of claim 7, wherein the storage device comprises a first secure element, wherein:

the first secure element stores the object for the identified right of content usage as encrypted information; and the delivery of the copy of the encrypted information includes functions implemented by the processor to:

delete, by the premium content reproduction device, the encrypted information from the first secure element.

11. The premium content reproduction device of claim 7, wherein the processor is configured to implement further functions, including functions to:

receive, from the mobile device, the object for the identified right of content usage that previously resided in a second premium content reproduction device; and process further received content for reproduction via the content reproduction circuitry, in accordance with the identified right of usage using the received object for the identified right of content.

12. The premium content reproduction device of claim 7, wherein the processor is configured to implement further functions, including functions to:
 restore the object for the identified right of content usage previously deleted by the premium content reproduction device upon receiving the copy of the object for the identified right of content usage from the mobile device.

13. A premium content reproduction device, comprising: a set top box, including:
 a communication interface system including a wireless communication transceiver and a near field communication (NFC) transceiver;
 content reproduction circuitry configured to process received content for reproduction via an output device in accordance with an identified right of content usage; and
 a processor coupled to the communication interface system and the content reproduction circuitry, configured to implement functions, including functions to:
  establish, via the NFC transceiver, an NFC communication with a mobile device;
  provide, responsive to a query received from the mobile device via the NFC transceiver, an identifier of the premium content reproduction device via the established NFC communication to the mobile device for authentication;
  receive, via the wireless communication transceiver and from a rights issuer (RI) of an object for the identified right of content usage as directed by the mobile device, a message including a copy of the object for the identified right of content usage that is transferred by the mobile device from another premium content reproduction device, wherein the copy of the object for the identified right of content usage is one of a copy of a Digital Rights Management (DRM) Rights Object (RO), encrypted information to be stored in a first secure element of the premium content reproduction device, or a subscription file to be stored in a cableCARD of the premium content reproduction device;
  process further received content for reproduction via the content reproduction circuitry, in accordance with the identified right of usage using the received copy of the object for the identified right of content usage;
  receive, upon the mobile device exiting a geo-fenced area relative to the premium content reproduction device, a notification:
   from the RI, when the copy of the identified right of content usage is the copy of the DRM RO, to delete the copy of the DRM RO,
   from a provider of the premium content, when the copy of the identified right of content usage is the subscription file, to disable the subscription file, and
   from the mobile device, when the copy of the identified right of content usage is encrypted information, to delete the encrypted information.

14. The premium content reproduction device of claim 13, wherein:
 the function to receive the copy of the DRM RO further comprises functions to:
  establish communication with the DRM RI and receive, via the established communication with the DRM RI, the copy of the DRM RO from the DRM RI, wherein the DRM RI sends the copy of the DRM RO in response to a request from the mobile device.

15. The premium content reproduction device of claim 13, wherein the function to receive the copy of the object for the identified right of content usage further comprises functions to:
 establish communication, by the premium content reproduction device, with a network device of the provider of the premium content;
 send a message, by the premium content reproduction device and via the established communication with the network device of the provider of the premium content, requesting the provider of the premium content to enable the subscription file in the premium content reproduction device; and
 enable the subscription file in the premium content reproduction device.

16. The premium content reproduction device of claim 13, wherein:
 the function to receive the encrypted information further comprises functions to:
  send an instruction to the mobile device to delete the encrypted information from a second secure element in the mobile device.

17. The premium content reproduction device of claim 13, wherein the copy of the object for the identified right of content usage has a time-limited validity based on the geo-fenced area and the content reproduction circuitry fails to process further received content when the validity expires.

18. The premium content reproduction device of claim 13, wherein the processor is configured to implement further functions, including functions to delete, from the first secure element, the encrypted information.

19. The premium content reproduction device of claim 13, wherein the processor is configured to implement further functions, including functions to:
 disable the subscription file stored in the cableCARD based on the notification.

20. The premium content reproduction device of claim 13, wherein the processor is configured to implement further functions, including functions to delete, from the premium content reproduction device, the copy of the DRM RO based on the notification.

* * * * *